United States Patent

[11] 3,612,500

[72] Inventors Norbert P. Cramer;
Jay A. Wiechert, both of Benton Harbor, Mich.
[21] Appl. No. 888,574
[22] Filed Dec. 29, 1969
[45] Patented Oct. 12, 1971
[73] Assignee Whirlpool Corporation
Benton Harbor, Mich.

[54] DRYER CONTROL CIRCUIT
4 Claims, 4 Drawing Figs.
[52] U.S. Cl. .................................................. 263/33 B, 34/45, 34/48
[51] Int. Cl. ................................................ F27b 7/00
[50] Field of Search ........................................... 34/44, 45, 48; 263/33 B

[56] References Cited
UNITED STATES PATENTS

| | | | |
|---|---|---|---|
| 3,203,679 | 8/1965 | Williams et al. ............... | 34/45 X |
| 3,286,361 | 11/1966 | Cobb et al. .................... | 34/48 X |
| 3,409,994 | 11/1968 | Menk ............................ | 34/48 X |

Primary Examiner—Carroll B. Dority, Jr.
Attorneys—James S. Nettleton, Thomas E. Turcotte, Burton H. Baker, Donald W. Thomas, Gene A. Heth, Franklin C. Harter, Anthony Niewyk, Robert L. Judd and Hill, Sherman, Meroni, Gross and Simpson ABSTRACT: A source of heat is operated at a high-output level during an initial portion of a drying cycle and at a lower output level during a subsequent portion of the drying cycle under the control of a dryer control circuit which includes a plurality of thermostats which control the electrical disposition of corresponding portions of the source of heat in circuit with an electrical supply. The dryer control circuit is applicable to both gas and electric dryers.

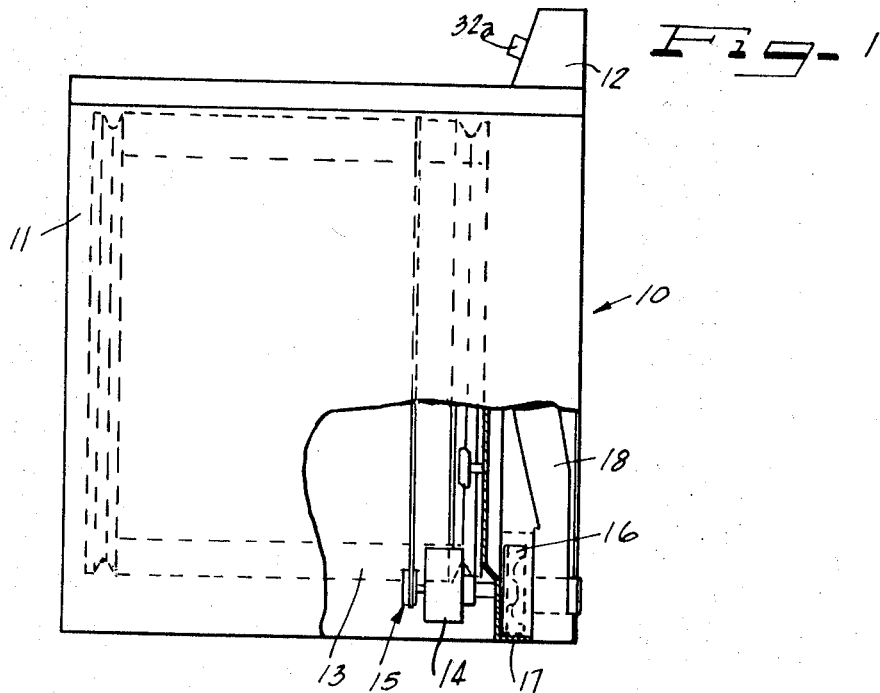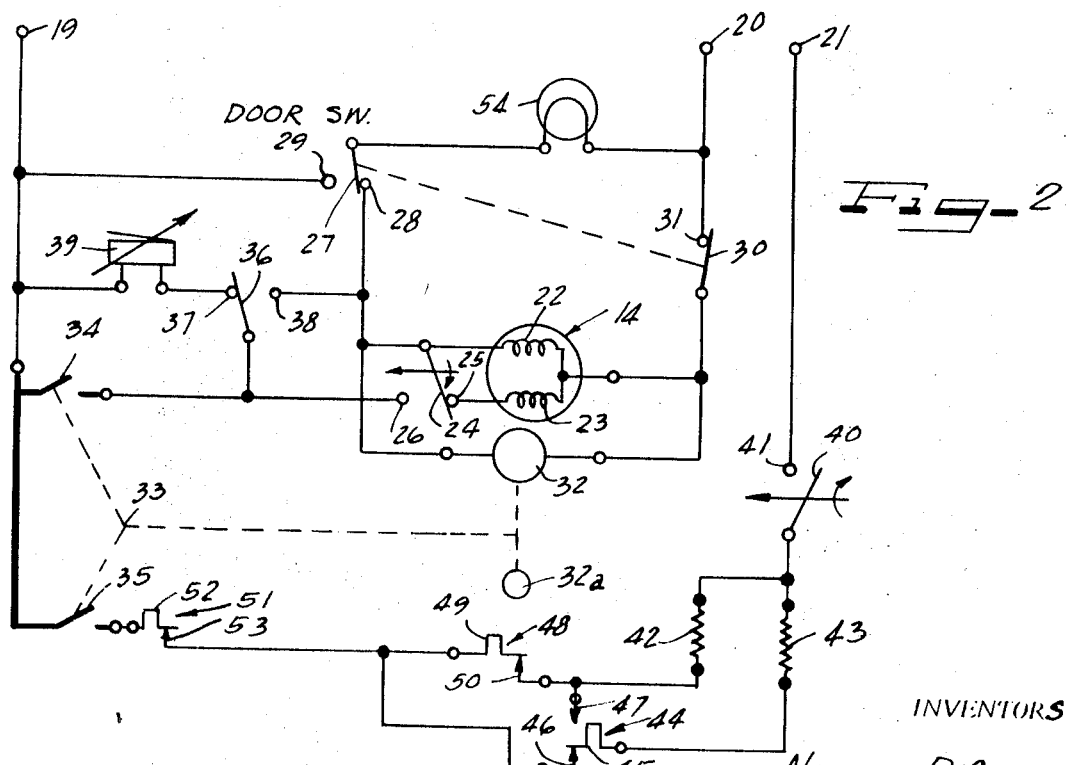

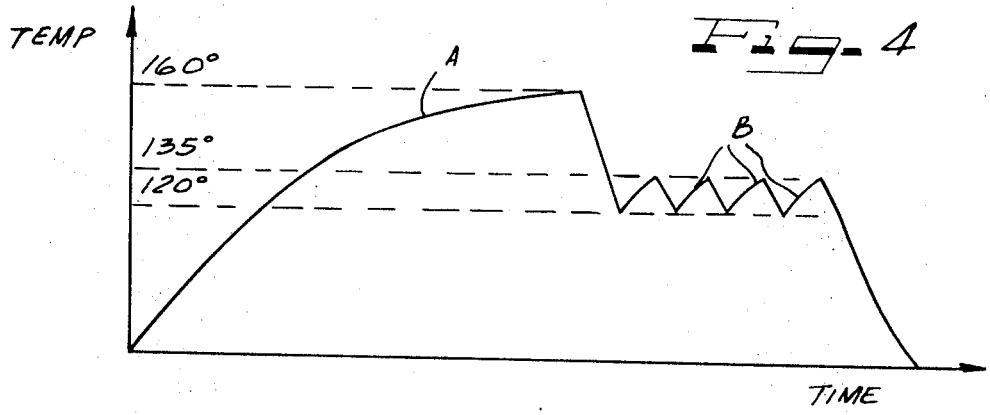
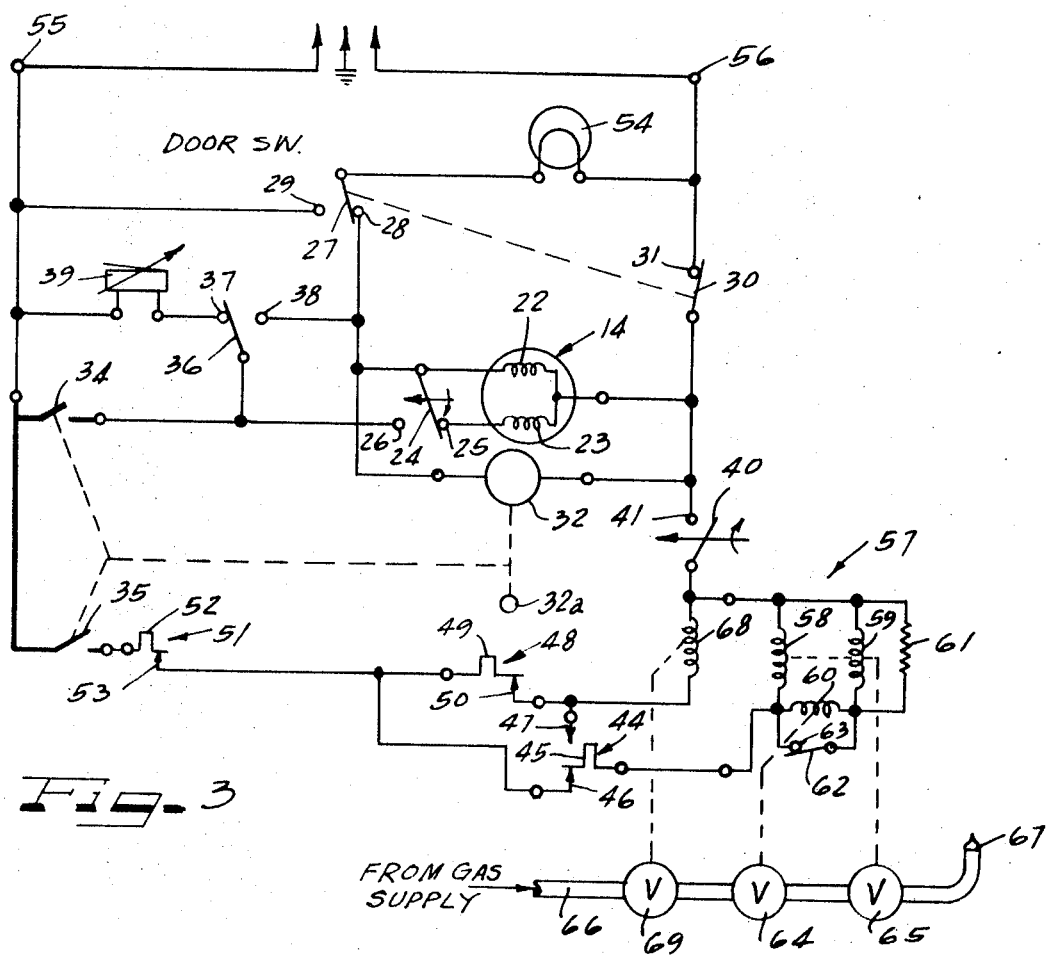

DRYER CONTROL CIRCUIT

BACKGROUND OF THE INVENTION

1. Field of the Invention

This invention relates to apparatus for controlling the operation of the dryer, and more particularly to a dryer control circuit for controlling the operation of a source of heat to produce a high level of heat output during an initial portion of a drying cycle and a lower level of heat output during a subsequent portion of the drying cycle.

2. Description of the Prior Art

The utilization of thermostat devices to control the application of heat to a treatment zone is well known. For example, in one prior art arrangement a pair of thermostats which have overlapping ranges of operation are connected in parallel to control a single heater. The thermostat having the higher temperature response for opening also has the lower temperature response for reclosing, and the other thermostat has its range of opening and closing temperatures within the range of the first thermostat. Accordingly, after the first thermostat has opened at the upper portion of its response range, the low-temperature thermostat repeatedly opens and closes the circuit to the heater during the remainder of the drying cycle.

In another construction two heat sources are initially and continuously actuated until a predetermined upper temperature limit has been obtained. When that temperature limit is reached a thermostat opens to permanently deactuate one of the heaters until the beginning of the next drying cycle, and a second thermostat controls the repetitive energization of the other heater.

In another prior art arrangement two heaters and two controlling thermostats are connected in a circuit wherein, during the initial portion of the drying cycle, one of the thermostats shunts one of the heaters to effect a high-level heat input to the dryer. Upon attaining a predetermined high temperature in the treatment zone, the shunting thermostat opens to place the previously shunted heater in series with the second heater to lower the heat output. The other thermostat is then employed to control the series connection of the two heaters during the remainder of the drying cycle.

SUMMARY OF THE INVENTION

According to the invention, a control circuit for a clothes dryer is effective to operate a heat source at a first high-output level to attain a first predetermined temperature, after which the heat source is operated at a second lower output level for the remainder of the drying cycle. Operation of the heat source at its first high-output level is accomplished under the control of a first thermostat which opens at the first predetermined temperature and transfers the control of the heat source to a second thermostat which is responsive to a second lower temperature. The first thermostat has a higher opening temperature and a lower closing temperature than the second thermostat to prevent operation of the heat source at its higher output level at any time during the drying cycle subsequent to the occurrence of the first predetermined temperature.

The dryer control circuit according to the invention permits operation of a clothes dryer with a relatively high heat input and a relatively high exhaust temperature during the initial stages of drying at a time when the material being dried is relatively wet and therefore less susceptible to heat damage, while at the same time automatically assuring that the materials will be exposed to a second lower temperature due to a lower heat input during the later stages of the drying cycle when more susceptible to heat damage. Further, a relatively high level of heat input may be advantageously employed during the initial portions of the drying cycle than would be used during later portions of the drying cycle, thereby effectively shortening the drying cycle.

In addition to the foregoing advantages, a dryer control circuit according to the present invention is applicable for both electric and gas dryers. With respect to gas-fired dryers in particular, the present invention provides a control system which is less costly than a gas control system, in which the gas burner is continually throttled down in response to exhaust temperatures.

Further, the dryer control circuit according to the invention will not permit the temperature in the treatment zone to rise above a predetermined temperature near the end of a cycle as can occur in a gas modulation system, which may result if an operator selects an excessive amount of drying time.

BRIEF DESCRIPTION OF THE DRAWINGS

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure, and in which:

FIG. 1 is an elevational view of a clothes dryer with a portion of the cabinet thereof broken away to reveal certain operational components thereof;

FIG. 2 is a schematic representation of a control circuit for an electric dryer according to the invention;

FIG. 3 is a schematic representation of a control circuit for a gas dryer according to the invention; and FIG. 4 is a graphical showing of the temperature in the treatment zone of a dryer in relation to time within a drying cycle.

DESCRIPTION OF THE PREFERRED EMBODIMENT

In the drawings, a clothes dryer, generally referenced 10, is illustrated as comprising a cabinet 11 having a control console 12 mounted thereon and an agitation means herein illustrated as a drum 13 rotatably mounted therein. A motor 14 is provided as a means for rotating the drum through the agency of coupling apparatus, which may comprise a pulley and belt arrangement 15. Also driven by the motor 14 and enclosed within a duct 17 is a fan 16 for moving heated air through the dryer over a path which may include the duct 17, a duct 18 and the drum 13.

It will be understood that the dryer also includes the same access door through which a batch of laundry materials to be dried may be loaded and unloaded.

The control circuit, as it is applicable to an electric dryer, includes a plurality of terminals 19, 20 and 21 for connection to a suitable electrical supply, which supply may be 240 volts, 60 Hz. The dryer control circuit includes a switch which is operated by the opening and closing of the door of the dryer to prepare the control circuit for operation. The door switch includes a transfer-type movable contact 27 and a pair of stationary contacts 28 and 29 for engaging contact 27, and a movable contact 30 for engaging a stationary contact 31. In the drawing, the door switch is shown as conditioning the control circuit for operation upon closing of the door. With the door open, contact 27 engages contact 29 to connect a lamp 54 across the supply terminals 19 and 20. The lamp 54 may be advantageously disposed to illuminate the interior of the drum 13 to aid in loading and unloading laundry. When the door is closed contact 27 is placed in engagement with contact 28 and contact 30 is placed in engagement with contact 31 to extend the terminal 20 to the dryer motor 14 and a timer motor 32 of a presettable timer.

The presettable timer includes a plurality of sequentially operable contacts 34 and 35 which are mechanically coupled to the timer motor 32 as indicated by the broken line 33. Rotation of a control knob 32a advances the position of the inner motor 32 to a point where the contacts 34 and 35 are closed. A starting switch is provided including a movable contact 36 for engaging a stationary contact 38 to extend an electrical connection from terminal 19 to the timer motor 32 and the dryer motor 14 by way of contact 34 and the contacts 36 and 38. The timer motor 32 is therefore energized for timing the drying cycle. It should be here noted that the starting switch may be a single-pole double-throw mechanically operable switch, or it may be a press-to-start manually operable switch which is biased to be urged toward contact 37 of the timer, In any event, contact 36 returns to engagement with contact 38 for the remainder of the drying cycle.

The dryer motor 14 includes a running winding 22 and a starting winding 23 which are connected in parallel during starting of the motor 14 by way of a centrifugally operated switch contact 24 and a stationary contact 25. Upon energization and sufficient rotation of the motor 14, the contact 24 transfers from the contact 25 to remove the starting winding 23 from the circuit and engages a second stationary contact 26 to provide an operating path for the winding 22 by way of the timer contact 34.

The motor 14 also comprises a centrifugally operated movable contact 40 for engaging a stationary contact 41 to transfer electrical energy by way of terminal 21 to a pair of heating elements 42 and 43 which constitute the heat source for the dryer. The heating element 42 is connected by way of a thermostat 48 and a thermostat 51 to timer contact 35, and the heating element 43 is connected by way of a thermostat 44 and the thermostat 51 to timer contact 35. The heating element 42 is therefore energized over a path including input terminal 19, timer contact 35, a normally closed heat-sensing movable contact 52 and a stationary contact 53 of thermostat 51, a normally closed heat-sensing movable contact 49 and a stationary contact 50 of the thermostat 48, the heating element 42, closed contacts 40 and 41, and terminal 21. The heater element 43 is energized over a similar path including input terminal 19, the closed timer contact 35, the contacts 52 and 53 of the thermostat 51, a normally closed heat-sensing movable contact 45 and a stationary contact 46 of the thermostat 44, the heater element 43, the closed contacts 40 and 41, and the input terminal 21.

Upon closure of the contacts 40 and 41 both heater elements 42 and 43 are energized to provide heated air for delivery to the interior of the drum 13 by the fan 16, the contact 35 having been closed on setting of control knob 32a to the starting position. The heater element 42 and the heater element 43 may be rated at, for example, 3,100 and 2,500 watts, respectively.

The thermostats are positioned to sense the temperature within the drum or the temperature of the exhaust air from the drum. As the temperature increases and passes through 135° F. the movable contact 45 disengages from the stationary contact 46 and transfers to an engagement with another stationary contact 47 of the thermostat 44 to maintain the heater element 43 in an energized condition by way of thermostat 48. When the temperature reaches 160° F. the movable contact 49 disengages from the stationary contact 50 of the thermostat 48 to open the energizing circuit for the element 42 and the element 43 and the treatment zone within the drum begins to cool. As the temperature within the drum drops to 120° F. the thermostat is reset and the movable contact 45 disengages from the stationary contact 47 and reengages with the stationary contact 46 to restore the heating element 43 to an energized condition. The thermostat 44 will continue to respond to temperature changes within the drum to transfer the movable contact 45 between the stationary contacts 46 and 47 for the remainder of the drying cycle. The thermostat 48 has a reset temperature below the reset temperature of the thermostat 44, which in this example would be below 120° F. and may be at 110° F. The heater element 42 cannot therefore be energized during the remainder of the drying cycle.

The thermostat 51 is a safety thermostat having an opening temperature above the opening temperature of the thermostat 48.

The thermostat 44 continues to cycle the energization of the heater element 43 until the timer motor 32 has run sufficiently to open the contact 35 and open the circuit to the heater elements 42 and 43.

The timer motor 32 continues to operate by way of the contact 34 until such time as contact 34 is opened. Upon the opening of the contact 34 the buzzer 39 is energized via contacts 36, 37, 24 and 26, and motor 14; the opening of the contacts 34 removing a shunt to place the adjustable buzzer 39 in circuit with the dryer motor 14. The timer motor 32 and the drive motor 14 are deenergized when contact 34 opens. The buzzer 39 is energized for only a few seconds while motor 14 slows down to a predetermined speed. At the predetermined speed contact 24 moves away from contact 26 thus breaking the circuit to buzzer 39.

FIG. 4 illustrates the manner in which heat is supplied to the interior of the drum 13 during a drying cycle wherein the reference character A may represent a heat dissipation of 5,600 watts (heater elements 42 and 43) and the reference character B may represent a heat dissipation of 2,500 watts (heater element 43).

An embodiment of the invention as it may apply to a gas dryer is illustrated in FIG. 3 wherein like reference numerals have been employed for elements that are the same as and have the same function as elements illustrated in FIG. 2. It is apparent from the drawing that the dryer control circuit of FIG. 3 operates in exactly the same manner as the dryer control circuit of FIG. 2 with the exception that the heat source is a gas burner which has connected thereto certain gas-flow-controlling elements. Therefore, the following discussion of FIG. 3 will be limited, as much as possible, only to the heating circuit portions of the circuit.

After wet laundry has been loaded into the dryer 10, operation of the motor 14 initiated to close the contacts 40 and 41, and energization of the timer motor 32 has been initiated to close the contacts 34 and 35 to connect the electrical supply from an input terminal 55 to the safety thermostat 51 and the heat-source-controlling thermostats 44 and 48. The closing of the contacts 35 and 40 provide energizing potentials for controlling the ignition and operation of a gas burner apparatus 57 which is also connected to a suitable gas supply of a conduit 66.

The gas burner apparatus 57 includes a pair of windings 58 and 59 for controlling the opening and closing of a valve 65. The energizing potentials supplied across windings 58 and 59 at switch 40 and the contact 45 of the thermostat 44, and by way of closed contacts 62 and 63, energize these windings to open the valve 65. At the same time, these energizing potentials are being supplied to an igniter 61 which may be constructed of a silicon carbide composition and which is energizable to glow and provide an ignition temperature for the gas. The gas from the supply is however, prevented from reaching the vicinity of the igniter 61 by a closed valve 64. The opening and closing of the valve 64 is controlled by the energization and deenergization of a winding 60 which is shunted by the closed contacts 62 and 63. The contact 62 is temperature sensitive and opens in response to the attainment of an ignition temperature by the igniter 61 to remove the shunt across the windings 60 and to permit energization thereof to open the valve 64 and to permit gas flow to the burner to produce a flame 67.

A valve 69 is also provided in series in the gas circuit. This valve 69 is a two-level valve which is normally opened in a flow restriction condition to provide a first quantity of gas to the burner, and is operable under the control of a winding 68 to a fully open condition to provide a greater quantity of gas flow to the burner. The winding 68 is energized in the initial portion of the drying cycle over a circuit including the contacts 40 and 41 and the thermostat 48. Therefore, energization of the windings 58, 59 and 60 are placed under the control of the thermostat 44 as was the heater element 43 in FIG. 2, and energization of the winding 68 is placed under the control of the thermostat 48 as was the element 42 in FIG. 2.

During the initial portion of the drying cycle the windings 58, 59 and 60 are energized to open the valves 64 and 65, and the winding 68 is energized to fully open the valve 69 in order to supply a sufficient quantity of fuel to the burner to provide a high level of heat output, for example 25,000 B.t.u./Hr. This high level of heat output may also be represented by the reference character A in FIG. 4. After the predetermined opening temperature of the thermostat 48 is reached, the contacts 49 and 50 thereof remain open, as in the previous illustration, until the end of the drying cycle, during which time the winding 68 is deenergized and the valve 69 returns to its flow restricting condition. During the remainder of the drying cycle, the thermostat 44 cycles the energization of the windings 58, 59 and 60 and the igniter 61 to operate the gas burner at low level of heat output as again represented by the reference character B of FIG. 4. This low level of heat output may be, for example, 10.000 B.t.u./Hr.

It will be appreciated from the foregoing description that a dryer is provided with a control circuit, applicable to both electric and gas configurations, which controls the operation of a heat source at a relatively high output level during the initial portions of the drying cycle at which time the laundry is relatively wet and immune to heat damage, and at a lower level of heat output during the later portions of the drying cycle when the laundry is more susceptible to heat damage. Further, the drying cycle may be shortened by the ability to provide a relatively high level of heat to a treatment zone until such time as such a level of heat would be detrimental to the clothing in the treatment zone.

The embodiments of the invention in which an exclusive property or privilege is claimed are defined as follows:

1. A laundry appliance comprising:
   a rotatable drum for receiving laundry;
   a motor for rotating said drum;
   a presettable control device connectable to an electrical supply for controlling the operation of the appliance through a selected laundry program including a drying cycle;
   a source of heat for said drum connected to said control device for energization by the electrical supply, said source of heat including
      first and second controllable energization circuits for operating said source of heat at a high heat output and a lower heat output,
      means connected between said control device and said source of heat for controlling the operation of said source of heat including temperature-responsive-switching means disposed to sense the temperature within said drum and connected between said control device and said first and second controllable energization circuits, said switching means being responsive to the temperature within said drum to effect operation of both of said controllable energization circuits during an initial portion of the drying cycle and to effect operation of only one of said energization circuits during a subsequent portion of the drying cycle,
         wherein said temperature-responsive-switching means includes a first thermostat having a first contact connected to said control device and a second movable contact connected to said first controllable energization circuit, and a second thermostat having a third contact connected to said control device, a fourth movable contact connected to said second controllable energization circuit, and a fifth contact connected to said contact of said first thermostat,
         said second thermostat being responsive to first and second temperature to transfer said fourth contact back and forth between said third and fifth contacts, and
         said first thermostat opening and closing said first and second contacts in response to third and fourth temperatures, respectively, which lie outside of the range defined by said first and second temperatures.

2. A laundry appliance according to claim 1, wherein said source of heat comprises
   a gas burner for connection to a gas supply,
   a first solenoid valve including on-off valve means serially interposed between said burner and the gas supply, and first operating winding means connected to said temperature-responsive-switching means as said first controllable energization circuit,
   a second solenoid valve including a two-level valve means also serially interposed between said burner and the gas supply,
      said two-level being normally open to a flow-restricting condition and operable to a greater flow condition, and second operating winding means connected to said temperature-responsive-switching means as said second controllable energization circuit, and
   an igniter connected to said first operating winding means for igniting the gas supplied to said burner.

3. Drying apparatus comprising:
   means defining a treatment zone receiving material to be dried; supplied
   a source of heat for providing thermal energy to said treatment zone; and
   means for operating said source of heat during a timed drying cycle at a plurality of heating output levels including
   first means for operating said source of heat at a first heating output level during an initial portion of the cycle until a first predetermined temperature is attained in said treatment zone, comprising a first normally closed thermostat, and
   second means for operating said source of heat at a second heating output level which is lower than said first heating output level to maintain a temperature which is lower than said first predetermined temperature during a subsequent portion of said drying cycle, comprising a second normally closed thermostat cooperable with said first thermostat to establish a plurality of electrical circuits which connect said source of heat to an electrical supply,
   said first thermostat connected in a first of said electrical circuits and operable to an open condition in response to said first predetermined temperature,
   said second thermostat connected in a second of said electrical circuits and operable to open said second circuit in response to a second predetermined temperature and to close in response to a third predetermined temperature lower than said second predetermined temperature to maintain an intermediate temperature, said second thermostat comprising s first contact, a second movable contact normally closed to said first contact, and a third contact connected to said first thermostat, said movable second contact transferring from said first contact to said third contact in response to said second predetermined temperature to provide a third electrical circuit for said source of heat through said first thermostat prior to attainment of said first predetermined temperature within said treatment zone,
   said first thermostat operable to reestablish its corresponding electrical circuit at a temperature below said third predetermined temperature.

4. Drying apparatus comprising:
   means defining a treatment zone for receiving material to be dried;
   a source of heat for providing thermal energy to said treatment zone; and
   means for operating said source of heat during a timed drying cycle at a plurality of output heating levels including
      first means, including a first thermostat, for operating said source of heat at a first heating output level during an initial portion of the cycle until a first predetermined temperature is attained in said treatment zone, and
      second means, including a second thermostat, for operating said source of heat at a second heating output level which is lower than the first heating output level to maintain a temperature which is lower than said first predetermined temperature during a subsequent portion of the drying cycle,
      said source of heat comprising a gas burner including a connection to a gas supply, first solenoid valve means having a first valve means disposed in said gas supply connection and first operating winding means connected to said second thermostat to effect opening and closing of said first valve means, and
second solenoid valve means including a second valve means disposed in said gas supply connection and having an open condition and a flow-restricting condition, and second operating winding means connected to said first thermostat for operating said second valve means between its open conditions.

UNITED STATES PATENT OFFICE
CERTIFICATE OF CORRECTION

Patent No. 3,612,500                    Dated October 12, 1971

Inventor(s)  Norbert P. Cramer, et al

It is certified that error appears in the above-identified patent and that said Letters Patent are hereby corrected as shown below:

Claim 2, column 6, line 6 read "two-level being" as --two-level valve being--;

Claim 3, column 6, line 14 read "zone receiving" as --zone for receiving--;

Claim 3, column 6, line 15 delete "supplied".

Signed and sealed this 9th day of May 1972.

(SEAL)
Attest:

EDWARD M. FLETCHER, JR.
Attesting Officer

ROBERT GOTTSCHALK
Commissioner of Patents